(12) United States Patent
Moon et al.

(10) Patent No.: US 8,603,665 B2
(45) Date of Patent: *Dec. 10, 2013

(54) BATTERY PACK OF IMPROVED STABILITY

(71) Applicant: LG Chem, Ltd., Seoul (KR)

(72) Inventors: Ki eob Moon, Seoul (KR); Tae il Kim, Gwangmyeong-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/864,758

(22) Filed: Apr. 17, 2013

(65) Prior Publication Data

US 2013/0230758 A1 Sep. 5, 2013

Related U.S. Application Data

(63) Continuation of application No. 11/334,234, filed on Jan. 18, 2006, now Pat. No. 8,440,345.

(30) Foreign Application Priority Data

Jan. 21, 2005 (KR) .......................... 10-2005-0005623

(51) Int. Cl.
*H01M 6/12* (2006.01)
(52) U.S. Cl.
USPC .......................................... 429/162; 429/163
(58) Field of Classification Search
None
See application file for complete search history.

(56) References Cited

U.S. PATENT DOCUMENTS

| | | | |
|---|---|---|---|
| 6,218,041 B1 * | 4/2001 | Barbier et al. ................. | 429/96 |
| 6,432,575 B1 | 8/2002 | Yamagami | |
| 6,451,474 B1 | 9/2002 | Kozu et al. | |
| 6,492,058 B1 | 12/2002 | Watanabe et al. | |
| 6,524,732 B1 | 2/2003 | Iwaizono et al. | |
| 6,893,753 B2 | 5/2005 | Iwaizono et al. | |
| 7,410,723 B2 * | 8/2008 | Kim et al. ..................... | 429/175 |
| 2002/0142195 A1 | 10/2002 | Ehara | |
| 2003/0108780 A1 | 6/2003 | Iwaizono et al. | |
| 2003/0215702 A1 | 11/2003 | Tanjou et al. | |
| 2004/0091769 A1 | 5/2004 | Kawabata et al. | |
| 2005/0112456 A1 * | 5/2005 | Kozu et al. ..................... | 429/62 |
| 2005/0164080 A1 | 7/2005 | Kozu et al. | |

FOREIGN PATENT DOCUMENTS

| | | |
|---|---|---|
| EP | 1 487 032 A1 | 12/2004 |
| JP | 11-111250 A | 4/1999 |
| JP | 11-135089 A | 5/1999 |
| JP | 2002-203534 A | 7/2002 |
| JP | 2003-178726 A | 6/2003 |

(Continued)

OTHER PUBLICATIONS

International Search Report for PCT/KR2004/002462 dated Dec. 23, 2004.

*Primary Examiner* — Cynthia K. Walls
(74) *Attorney, Agent, or Firm* — Birch, Stewart, Kolasch & Birch, LLP

(57) ABSTRACT

Disclosed herein is a battery pack wherein a rectangular battery having an electrode assembly and an electrolyte contained therein in a sealed state is received in a pack case, and an insulating material is filled in a space defined between the inner surface of the upper end of the pack case and the upper end of the battery, whereby the battery pack is manufactured with a reduced thickness, the assembly process of the battery pack is very simple, and short circuit of the battery pack or suspension of power supply from the battery pack, which may occur as the battery is moved, is effectively prevented even when the battery pack falls down or external impacts are applied to the battery pack.

13 Claims, 7 Drawing Sheets

(56) References Cited

FOREIGN PATENT DOCUMENTS

| | | | |
|---|---|---|---|
| JP | 2003-178747 | 6/2003 | |
| JP | 2004-327378 A | 11/2004 | |
| WO | WO 03/069697 * | 8/2003 | ............ H01M 2/10 |
| WO | WO 03/069697 A1 | 8/2003 | |
| WO | WO 2005/031897 A1 | 4/2005 | |

* cited by examiner

BATTERY PACK OF IMPROVED STABILITY

CROSS REFERENCE TO RELATED APPLICATIONS

This application is a Continuation of co-pending U.S. application Ser. No. 11/334,234 filed on Jan. 18, 2006, which claims priority to Korean Application No. 10-2005-0005623 filed on Jan. 21, 2005. The entire contents of all of the above applications are hereby incorporated by reference in their entireties.

FIELD OF THE INVENTION

The present invention relates to a battery pack having improved stability, and, more particularly, to a battery pack wherein a rectangular battery having an electrode assembly and an electrolyte contained therein in a sealed state is received in a pack case, and an insulating material is filled in a space defined between the inner surface of the upper end of the pack case and the upper end of the battery, whereby the battery pack is manufactured with a reduced thickness, the assembly process of the battery pack is very simple, and short circuit of the battery pack or suspension of power supply from the battery pack, which may occur as the battery is moved, is effectively prevented even when the battery pack falls down or external impacts are applied to the battery pack.

BACKGROUND OF THE INVENTION

As mobile devices have been increasingly developed, and the demand of such mobile devices has increased, the demand of secondary batteries has been also sharply increased as an energy source for the mobile devices. One of the secondary batteries is a lithium secondary battery having high energy density and discharge voltage, on which much research has been carried out and which is now commercially and widely used.

Based on its external shape, the lithium secondary battery is generally classified as a cylindrical battery, a rectangular battery, or a pouch-shaped battery. Based on its electrolyte, the lithium secondary battery is classified as a lithium-ion battery or a lithium-ion polymer battery.

As the mobile devices have been miniaturized, the demand of the rectangular battery and the pouch-shaped battery, which have a relatively small thickness, has increased. A conventional pouch-shaped battery is shown in FIG. 1, which is an exploded perspective view of the conventional pouch-shaped battery, and FIG. 2, which is an assembled perspective view of the conventional pouch-shaped battery.

Referring to FIGS. 1 and 2, the pouch-shaped battery 10 comprises: a pouch-shaped case 20 having an inner space 21 of a predetermined size defined therein; a cover 30 hingedly connected to the pouch-shaped case 20; an electrode assembly 40 including cathode plates 41, anode plates 42, and separators 43, the electrode assembly 40 being located in the receiving part 21 of the pouch-shaped case 20; electrode taps 41a and 42a extending from the ends of the cathode plates 41 and the anode plates 42 of the electrode assembly 40, respectively; and electrode terminals 50 and 51 connected to the electrode taps 41a and 42a, respectively.

At the upper edge of the receiving part 21 of the pouch-shaped case 20 is formed a side extension part 22 having a predetermined width, which is provided for thermal welding. To the middles of the electrode terminals 50 and 51 connected to the electrode taps 41a and 42a is applied a terminal tape 52, which is made of a insulating material to prevent occurrence of short circuit between the electrode terminals 50 and 51 when the side extension part 22 of the pouch-shaped case 20 and a side part 31 of the cover 30 are attached to each other by a thermal welding machine (not shown).

A method of manufacturing the conventional pouch-shaped battery with the above-stated construction will be described below.

First, the electrode assembly 40, which includes the cathode plates 41, the anode plates 42, and the separators 43, is located in the receiving part 21 of the pouch-shaped case 20, and then a predetermined amount of electrolyte is poured into the inner space of the pouch-shaped case 20. At this time, the electrode taps 41a and 42a of the electrode assembly 40 is connected to the corresponding electrode terminals 50 and 51, to the middles of which the terminal tape 52 is applied, and the electrode terminals 50 and 51 and the terminal tape 52 partially protrude from the pouch-shaped case 20 and the cover 30.

Subsequently, the cover 30 is brought into tight contact with the pouch-shaped case 20, and the side extension part 22 of the pouch-shaped case 20 and the side part 31 of the cover 30 are attached to each other in a sealed state by the thermal welding machine (not shown) such that the electrolyte does not leak from the pouch-shaped case 20.

The typical shape of a battery pack having the above-described pouch-shaped battery mounted therein is shown in FIG. 3. FIG. 4 is an exploded perspective view of the battery pack before the battery pack is assembled.

Referring to FIGS. 3 and 4, the battery pack 60 comprises: a rectangular battery 10 having an electrode assembly, which includes cathodes, anodes, and separators, and an electrolyte contained therein in a sealed state; a case body 70 having an inner space to receive the battery 10; and an upper cover 80 attached to the upper part of the case body 70, in which the battery 10 is received, for sealing the battery 10. Between the case body 70 and the battery 10 and between the upper cover 80 and the battery 10 are disposed double-sided adhesive tapes 90.

Generally, the battery pack 60 having the above-stated construction is assembled by attaching the case body 70 and the upper cover 80, which are made of a plastic material, such as polycarbonate (PC) or polyacrylonitrile-butadiene-styrene (ABS), by an ultrasonic welding method. The ultrasonic welding method is a method of welding two surfaces to be attached using frictional heat generated by vibrations of high frequency, for example, 20,000 Hz.

However, as the demand of battery packs having further decreased thicknesses has increased, the thicknesses of the case body 70 and the upper cover 80 are reduced to 0.3 to 0.35 mm. As a result, it is difficult to manufacture the case body and the upper cover by die casting and injection molding. Furthermore, the welding strength is reduced, and therefore, poor welding rate is increased.

In the case that a can is used as the case of the battery, the can provides an adequate strength with regard to the external impacts due to the structural characteristics of the can even though the thickness of the can is small. On the other hand, the pouch-shaped battery 10 as shown in FIG. 1 has a low structural strength with regard to the external impacts. For this reason, the application of the case having a small thickness to the battery pack is restricted.

Furthermore, when the external impacts are applied to the battery pack, the battery 10 is moved upward and downward in the inner space defined between the case body 70 and the upper cover 80, even though the battery 10 and the case body 70 are attached to each other and the battery 10 and the upper cover 80 are attached to each other by the double-sided adhesive tapes 90, with the result that short circuit or suspension of power supply occurs.

For this reason, a battery pack that can be easily manufactured and that has an adequate strength with regard to the external impacts and a high resistance to short circuit or suspension of power supply from the battery pack is highly required.

SUMMARY OF THE INVENTION

Accordingly, it is an object of the present invention to substantially obviate the above-mentioned problems of the conventional arts as well as the technical problems requested from the past.

Specifically, it is an object of the present invention to provide a battery pack that can be manufactured by a simple assembly process, whereby the manufacturing costs of the battery pack is reduced.

It is another object of the present invention to provide a battery pack that has a high impact-resistance even though a case having a small thickness is used and that can prevent electrical short circuit between the components of the battery pack or suspension of power supply from the battery pack when the external impacts are applied to the battery pack.

In accordance with an aspect of the present invention, the above and other objects can be accomplished by the provision of a battery pack comprising: a rectangular battery having an electrode assembly, which includes cathodes, anodes, and separators, and an electrolyte contained therein in a sealed state; a pack case having an inner space to receive the battery; and an insulating material filled in an empty space defined between the inner surface of the upper end of the pack case and the upper end of the battery.

In the battery pack according to the present invention; the battery can be fixedly located in the pack case without using an ultrasonic welding method, and therefore, the size and the structure of the case are not particularly restricted. Also, the movement of the battery in the inner space of the case is restrained, and therefore, short circuit of the battery pack or suspension of power supply from the battery pack due to the external impacts is effectively prevented.

The pack case is not particularly restricted so long as the pack case surrounds the side surfaces of the battery while the pack case has an inner space to receive the battery. For example, the pack case may be a frame-shaped member that surrounds only the side surfaces of the battery or a box-shaped member that surrounds the side surfaces and the lower surfaces of the battery. Preferably, the pack case is a box-shaped member that is closed at the lower part thereof. Since the pack case is open at least at the upper part thereof irrespective of whether the pack case is the frame-shaped member or the box-shaped member, the battery is located in the inner space of the pack case through the open upper part of the pack case.

The material for the pack case is not particularly restricted so long as the battery is protected by the pack case. For example, the pack case may be made of a plastic material, such as polycarbonate (PC) or polyacrylonitrile-butadiene-styrene (ABS), or a metal material, such as stainless steel (SUS).

Preferably, the battery is a pouch-shaped battery, which can be manufactured to be light weight with small thickness although the mechanical strength of the pouch-shaped battery is low. More preferably, the battery is a lithium-ion polymer battery having low possibility of leakage of an electrolyte. When the pouch-shaped battery is located in the inner space of the pack case, an empty space is formed between the inner surface of the upper end of the pack case and the upper end of the pouch-shaped battery because of the construction of electrode terminals, a protection circuit module (PCM), and insulating members, which are mounted at or coupled to the upper end of the pouch-shaped battery. The upper end of the battery is relatively weak with the result that the upper end of the battery is easily deformed when the battery pack falls or the external impacts are applied to the battery pack, and therefore, defectiveness of the battery pack is caused. For example, when the battery is moved toward the upper end of the inner space of the pack case as the battery pack falls or the external impacts are applied to the battery pack, short circuit is caused due to the electrical contact between the components of the battery pack. On the other hand, when the battery is moved toward the lower end of the inner space of the pack case, the electrical connection between the components disposed at the upper end of the battery is broken.

The present invention is characterized in that the insulating material is filled in the empty space defined between the inner surface of the upper end of the pack case and the upper end of the battery for performing a shock-absorbing function when the battery pack falls or the external impacts are applied to the battery pack and an electrical-connection reinforcing function.

Preferably, the insulating material is thermally melted, is filled in the empty space, and is then solidified. For example, the insulating material may be a plastic resin, although the insulating material is not particularly restricted. Preferably, the plastic resin is a thermoplastic resin a melting point of which is in a range of temperature in which the components located between the inner surface of the upper end of the pack case and the upper end of the battery are not deformed. According to circumstances, however, the insulating material is not particularly restricted so long as the insulating material is a material that is solidified by a chemical reaction or a physical reaction after the material is filled in the empty space. The chemical reaction includes solidification of materials through hardening by heat, light (visible rays, ultraviolet ray, etc.), or a catalyst, and the physical reaction includes solidification of materials through evaporation of solvent.

According to circumstances, the insulating material may be further filled in other empty spaces defined between the outer surface of the battery and the inner surface of the pack case.

In a preferred embodiment of the present invention, a packing label may be applied to the outer surface of the battery pack. The packing label may be formed in various shapes, for example, in the shape of a film, a thin tube having open upper and lower ends, or a thin box having an open upper end.

BRIEF DESCRIPTION OF THE DRAWINGS

The above and other objects, features and other advantages of the present invention will be more clearly understood from the following detailed description taken in conjunction with the accompanying drawings, in which.

Figure 1:
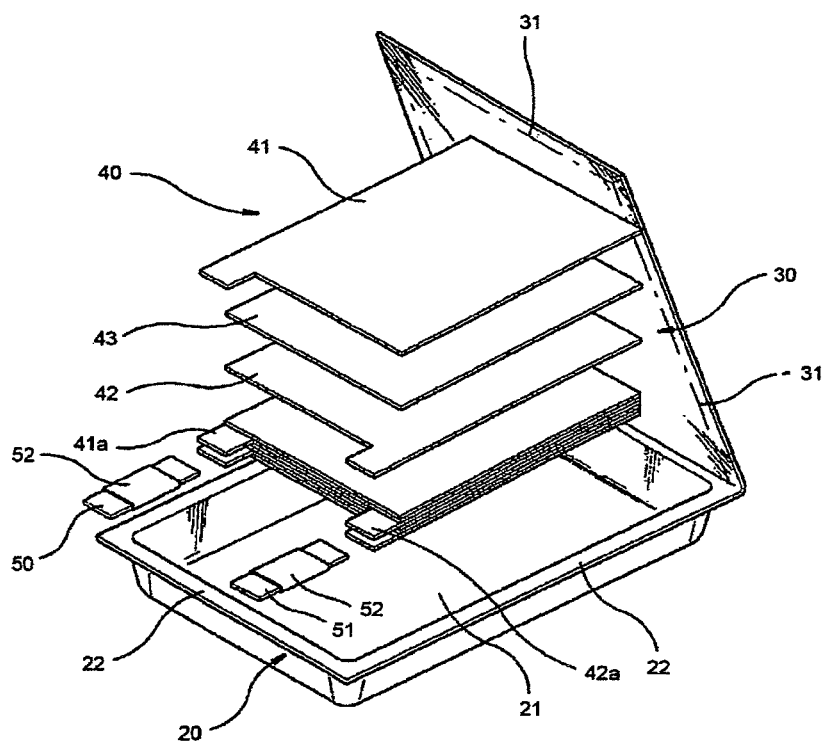
FIG. 1 is an exploded perspective view illustrating a conventional pouch-shaped battery.
Figure 2:
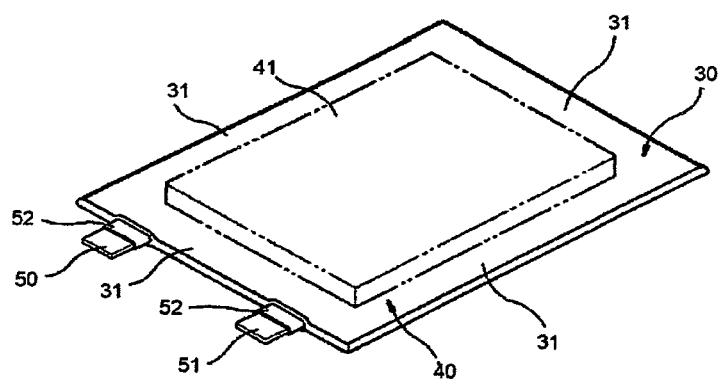
FIG. 2 is an assembled perspective view of the pouch-shaped battery shown in FIG. 1.
Figure 3:
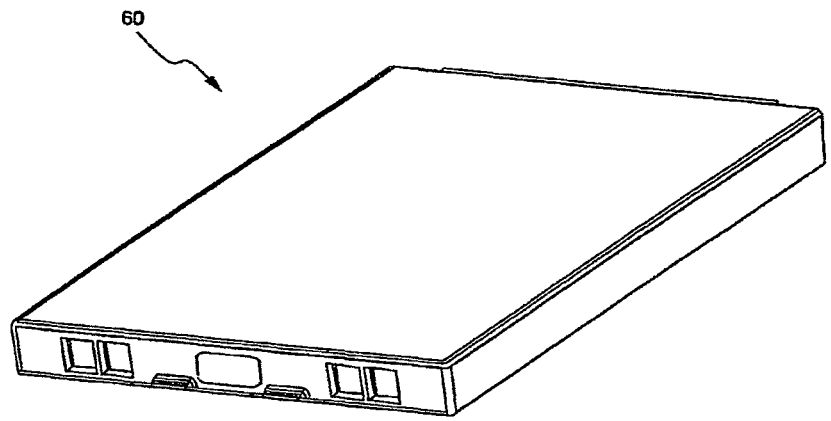
FIG. 3 is a perspective view illustrating a conventional battery pack having the pouch-shaped battery mounted therein.
Figure 4:
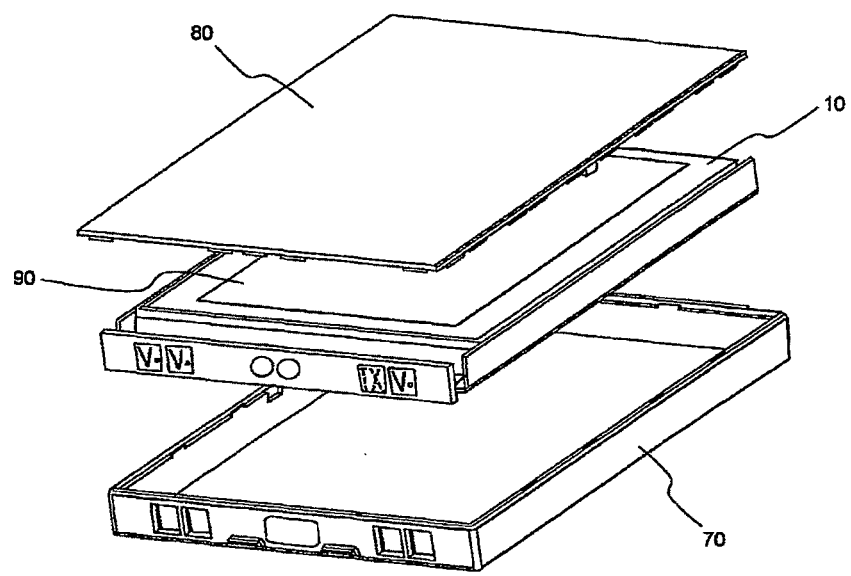
FIG. 4 is an exploded perspective view of the battery pack shown in FIG. 3.

| <Description of Main Reference Numerals of the Drawings> | |
|---|---|
| 100: pouch-shaped battery | 200: insulating member |
| 300: electrode terminals | 400: PCM |
| 500: battery pack | 600: pack case |
| 700: insulating material | 800: packing label |

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

First, a process of manufacturing an exemplary pouch-shaped battery, which can be preferably used in a battery pack according to a preferred embodiment of the present invention will be described with reference to FIGS. 5 to 9.

Figure 5:
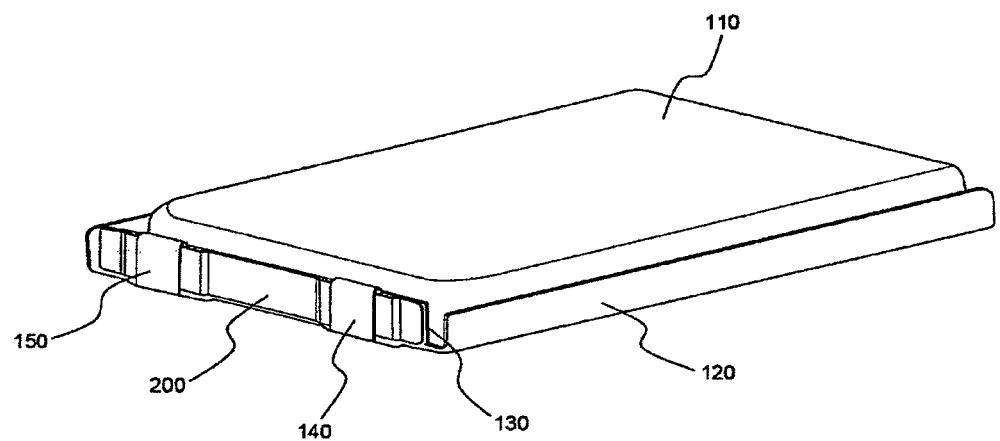
FIGS. 5 to 9 are perspective views schematically illustrating a process of manufacturing an exemplary pouch-shaped battery, which can be preferably used in a battery pack according to a preferred embodiment of the present invention.

Referring to FIG. 5, sealed outer edges 120 and 130 of a case, which are attached to each other by thermal welding in a state that an electrode assembly and an electrolyte are mounted in the battery pack, are bent upward. On the upper sealed outer edge 120 is, which is bent as described above, loaded a first insulating member 200, and a cathode terminal 140 and an anode terminal 150 are bent downward such that the cathode terminal 140 and the anode terminal 150 are placed on the first insulating member 200. The first insulating member 200 serves to stably maintain the electrical insulation between the electrode terminals 140 and 150 and a case body of the battery.

Figure 6:
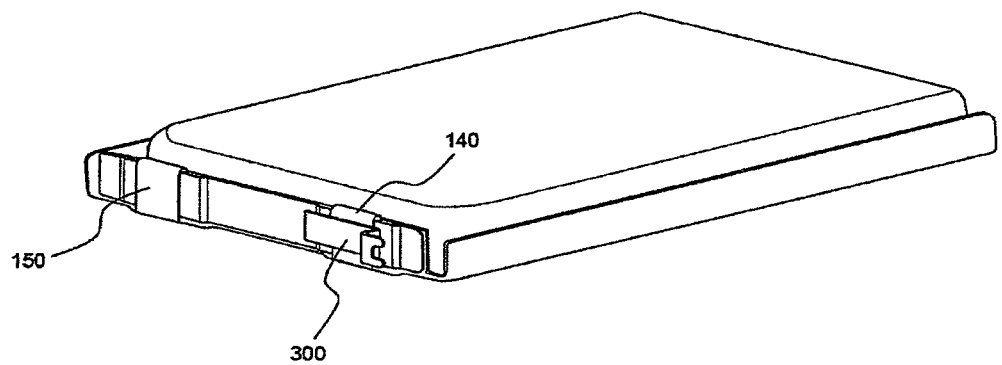
Figure 7:
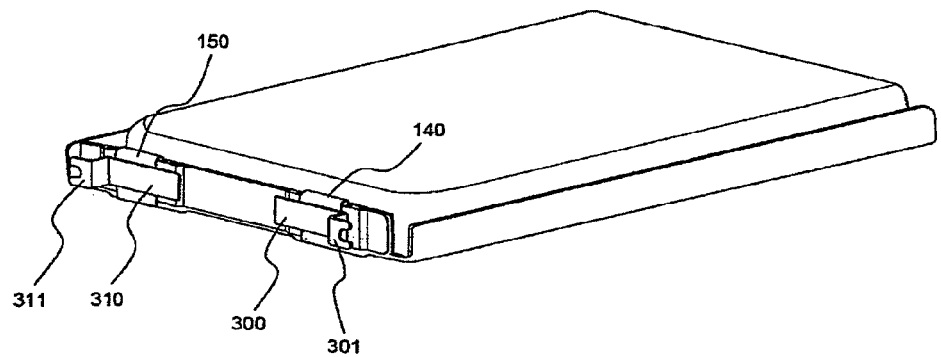

Referring to FIGS. 6 and 7, electrode leads 300 and 310, which are made of, for example, a nickel plate, are coupled to the cathode terminal 140 and the anode terminal 150, respectively. Preferably, the coupling between the electrode terminals 140 and 150 and the electrode leads 300 and 310 is accomplished by spot welding. The electrode leads 300 and 310 has a structure in which contact ends 301 and 311 opposite to the parts coupled to the electrode terminals 140 and 150 are bent upward, respectively.

Figure 8:
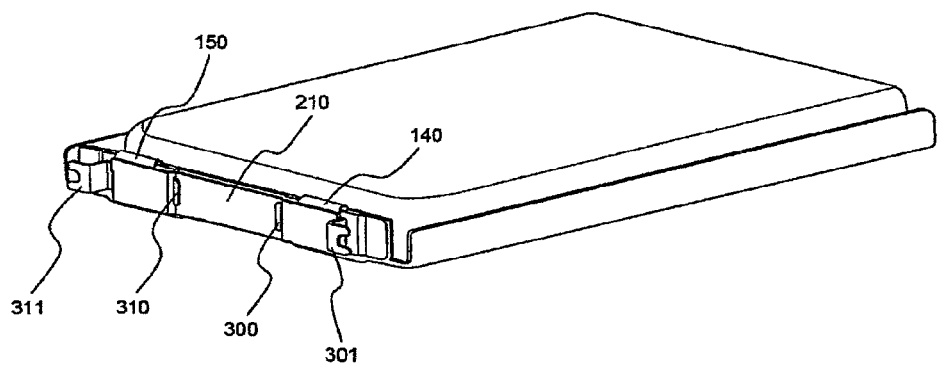

Referring to FIG. 8, a second insulating member 210 is mounted to cover the remaining parts of the electrode leads 300 and 310 excluding the contact ends 301 and 311. The second insulating member 210 serves to prevent the remaining parts of the electrode leads 300 and 310 excluding the contact ends 301 and 311 from being electrically connected to a protection circuit module (PCM) (not shown).

Figure 9:
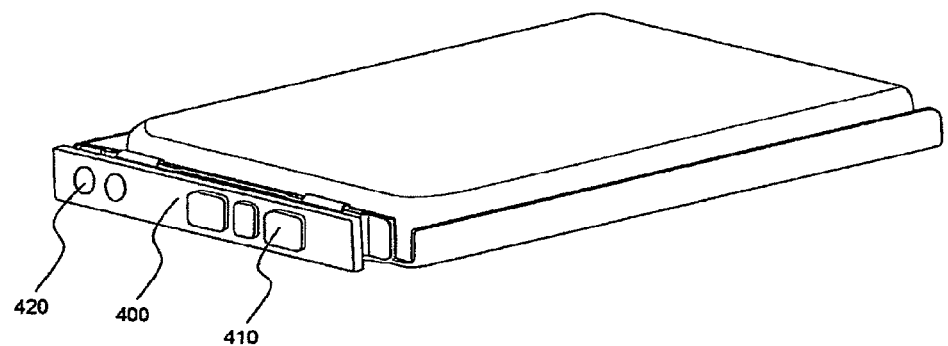

Referring to FIG. 9, a protection circuit module (PCM) 400 is loaded, and then the electrical connection between the electrode leads (not shown) and the protection circuit module (PCM) 400 is carried out. The protection circuit module (PCM) 400 includes a protection circuit for protecting the battery from overcharge, overdischarge, and overcurrent. The protection circuit module (PCM) 400 further includes external input and output terminals 410 for electrical connection with an external device (not shown) and test points 420 for confirming whether the battery is submerged or not. The coupling between the protection circuit module (PCM) 400 and the electrode leads (not shown) may be accomplished by various methods, for example, spot welding, laser welding, or soldering.

The pouch-shaped battery manufactured as described above has a large empty space between the upper end of the battery 100 and the protection circuit module (PCM) 400. As a result, the pouch-shaped battery is relatively weak when the pouch-shaped battery falls or the external impacts are applied to the pouch-shaped battery.

Figure 10:
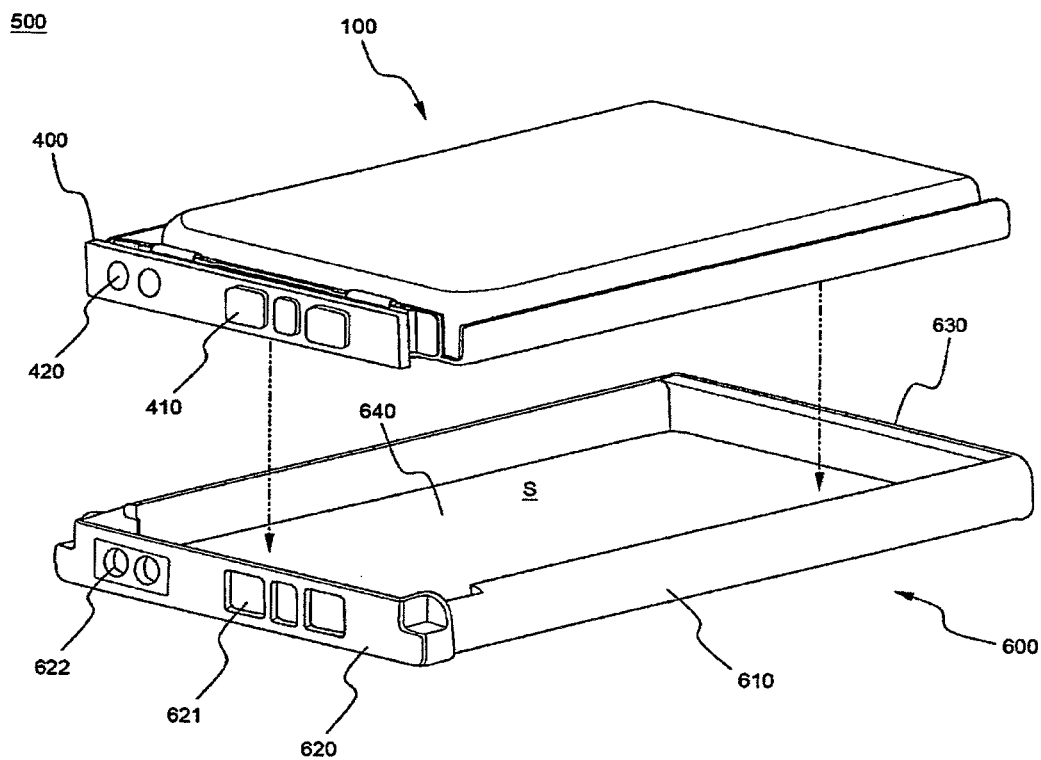
FIGS. 10 to 13 are perspective views schematically illustrating a process of manufacturing a battery pack according to a preferred embodiment of the present invention using the battery shown in FIG. 9.

FIG. 10 is an exploded perspective views schematically illustrating a process of manufacturing a battery pack 500 by mounting a battery in the inner space of the pack case according to a preferred embodiment of the present invention.

The pack case 600 is a rectangular member, which includes an inner space S having a shape corresponding to the outer surface of the battery 100. The pack case 600 is open at the upper part thereof. The pack case 600 includes frames 610, 620, and 630, which surround the side surfaces of the battery 100, and a lower plate 640 integrally formed with the frames 610, 620, and 630. At the upper frame 620 are formed windows 621, through which the external input and output terminals 410 of the protection circuit module (PCM) 400 are exposed, and holes 622, through which the test points 420 are exposed. The battery 100 is located in the inner space S of the pack case 600 defined by the frames 610, 620, and 630 and the lower plate 640 through the open upper part of the pack case 600.

Figure 11:
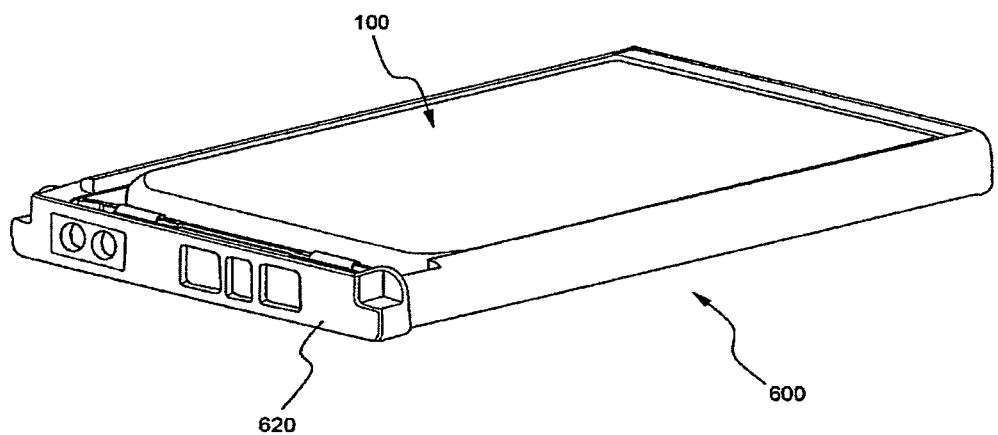

FIG. 11 is a perspective view schematically illustrating the battery located in the pack case through the process of FIG. 11.

Referring to FIG. 11, it can be seen that empty spaces remain between the inner surface of the upper end of the pack case 600, specifically, the inner surface of the upper frame 620 of the pack case, and the upper end of the battery 100, specifically, the upper end of the case body of the battery 100. That is, a plurality of empty spaces remain, at the regions where the electrode leads, the insulating members, and the protection circuit module (PCM) are disposed, between the inner surface of the upper end of the pack case 600 and the upper end of the battery 100. Such empty spaces are inevitably formed when the electrical connection between the electrode leads and the protection circuit module (PCM) is carried out and the insulating members are mounted. The battery pack is generally weak, when the battery pack falls or the external impacts are applied to the battery pack, due to the existence of the empty spaces.

Figure 12:
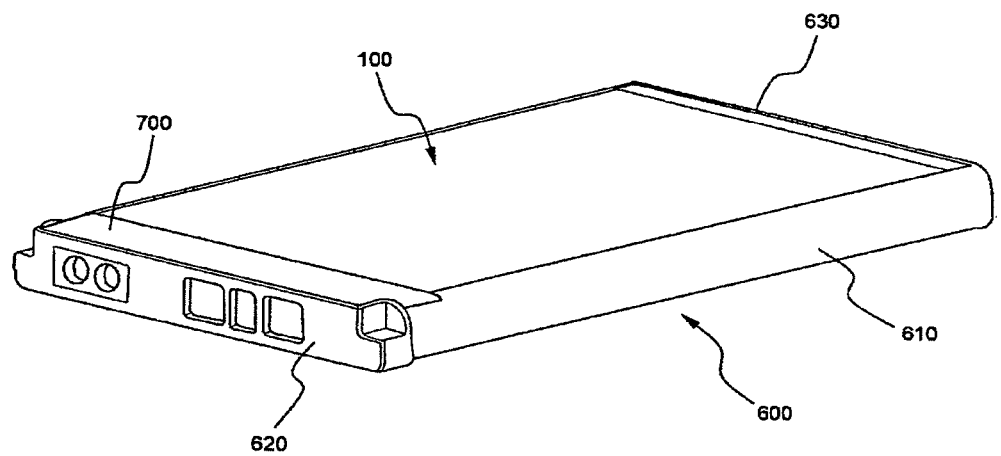

FIG. 12 is a perspective view schematically illustrating an insulating material filled in the empty spaces shown in FIG. 11. As described above, the filling of the insulating material 700 is accomplished by pouring various kinds of insulating materials into the spaces of the corresponding regions, and solidifying the insulating materials. The insulating member 700 filled between the inner surface of the upper end of the pack case 600 and the upper end of the battery 100 serves to effectively prevent the problems caused when the battery pack falls or the external impacts are applied to the battery pack while stably maintaining the electrical connection between the electrode leads and the protection circuit module (PCM) and the mounted state of the insulating members. According to circumstances, the insulating material 700 may be further filled in the empty space between the pack case 600 and the battery 100 in addition to the above-mentioned empty spaces. The empty spaces to be filled include, for example, empty spaces between the side frames 610 and/or the lower frame 630 of the pack case 600 and the side surfaces of the battery 100, and the upper end of the battery 100 after the battery 100 is located in the pack case 600. The insulating material 700 may be partially or wholly filled in the above-specified empty spaces. The filling of the insulating material 700 in the empty spaces results in more stable fixing of the battery 100 to the pack case 600.

Figure 13:
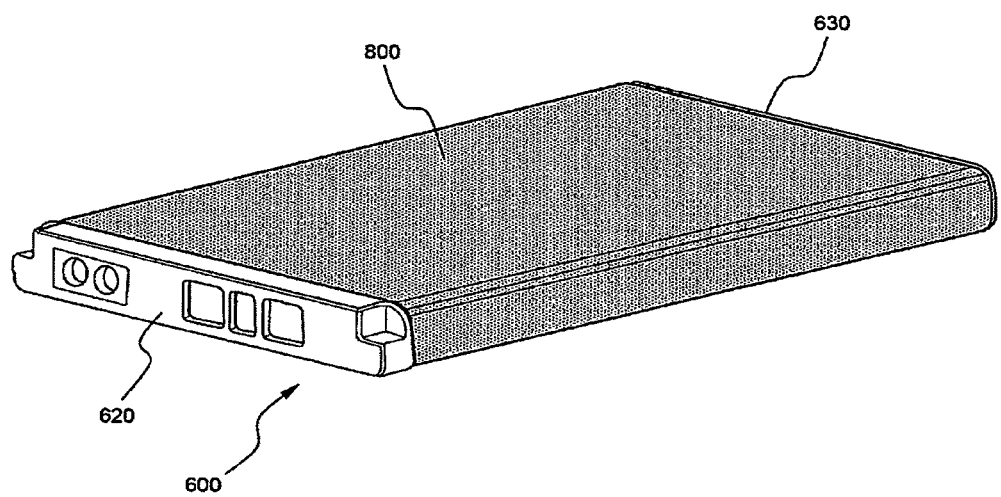

FIG. 13 is a perspective view schematically illustrating a packing label applied to the outer surface of the battery pack shown in FIG. 12.

Referring to FIG. 13, the packing label 800 is applied to the outer surface of the battery pack such that all the frames, excluding the upper frame 620 and the lower frame 630, the battery (not shown), and the insulating material (not shown) are completely sealed. The packing label 800 serves to further guarantee stable fixing of the battery to the pack case 600 and to protect the battery and the insulating material from the outside. It should be noted, however, that the applicable range of the packing label 800 is not particularly restricted.

Figure 14:
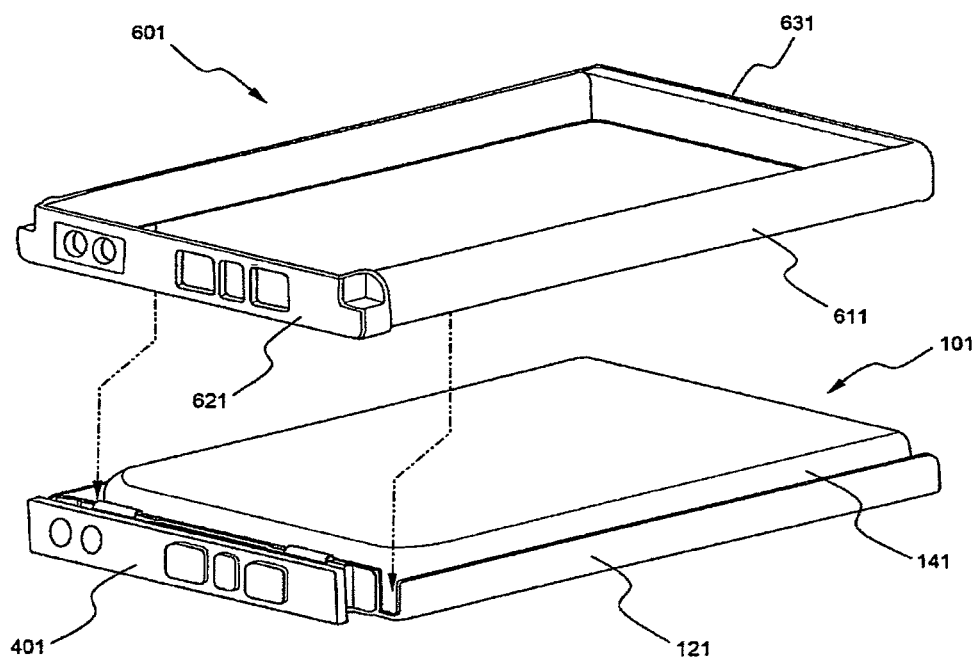
FIG. 14 is a perspective view illustrating a coupling mode between the pouch-shaped battery and the pack case according to another preferred embodiment of the present invention.

FIG. 14 is a perspective view illustrating a coupling mode between the frame members and the battery according to another preferred embodiment of the present invention.

The coupling mode shown in FIG. 14 is characterized in that a pack case 601 having open upper and lower parts is used, and side frames 611 of the pack case 601 are securely inserted between a battery body 141 and the bent parts of sealed outer edges 121 of the battery (the regions where the side extension part of the case body of the battery and the side part of the case cover are attached to each other by thermal welding), which are bent toward the battery body 141. Specifically, the pack case 601 includes only upper and lower frames 621 and 631 in addition to the side frames 611 with the result that the pack case 601 has a structure in which the upper and lower parts of the pack case 601 are open. Consequently, the side frames 611 can be securely inserted into the spaces defined between the battery body 141 and the sealed outer edges 121 bent toward the battery body 141, the details of which are disclosed in PCT International Patent Application (PCT/KR2004/002462) filed in the name of the present applicant, the disclosure of which is incorporated herein by reference.

On the other hand, the upper frame 621 surrounds the protection circuit module (PCM) 401 mounted at the upper end of the battery 101 as in FIG. 11, and the lower frame 631 surrounds the lower end of the battery 101. Consequently, empty spaces remain between the inner surface of the upper end of the pack case 600 and the upper end of the battery while the pack case 601 and the battery 101 are coupled with each other as in FIG. 11. The empty spaces are filled with an insulation material as in FIG. 12. Also, as in FIG. 13, the packing label may be applied to the outer surface of the manufactured battery pack 501.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, in order to accomplish easy coupling between the pack case and the battery, the frames of the pack case may be provided with grooves, in which the sealed outer edges of the battery are securely inserted. Also, the upper frame of the pack case or the lower plate of the pack case, which is adjacent to the upper frame of the pack case, may be provided with an inner structure, to which the protection circuit module (PCM) mounted at the upper end of the battery is stably coupled, (for example, a groove corresponding to the shape of the outer circumferential surface of the protection circuit module). Consequently, it is intended that all of the modifications, additions and substitutions fall within the scope of the present invention.

INDUSTRIAL APPLICABILITY

As apparent from the above description, it is possible to manufacture a battery pack having small thickness according to the present invention without using the ultrasonic welding method. Consequently, the use of an expensive precision ultrasonic welding machine is not necessary, and the assembly process of the battery pack is very simple. Furthermore, the insulating material is filled in the empty space defined between the inner surface of the upper end of the pack case and the upper end of the battery, and then the insulating material is solidified. Consequently, short circuit of the battery pack or suspension of power supply from the battery pack, which may occur as the battery is moved, is effectively prevented even when the battery pack falls down or external impacts are applied to the battery pack.

What is claimed is:

1. A battery pack comprising:
    a rectangular battery having an electrode assembly, which includes cathodes, anodes, and separators, and an electrolyte contained in a battery case in a sealed state;
    a pack case having an inner space to receive the rectangular battery, the pack case being a frame-shaped member that surrounds only side surfaces of the battery; and
    an insulating material filled in an empty space defined between an inner surface of the upper end of the pack case and an upper end of the battery,
    wherein electrode terminals of the electrode assembly protrude from the battery case and are bent around and into contact with one of side surfaces of the rectangular battery.

2. The battery pack according to claim 1, wherein the battery is a pouch-shaped battery.

3. The battery pack according to claim 1, wherein the insulating material is thermally melted to fill in the empty space between the inner surface of the upper end of the pack case and the upper end of the battery and is solidified in place.

4. The battery pack according to claim 1, wherein the insulating material is filled in a remaining empty space between side surfaces of the battery and the frame-shaped member.

5. The battery pack according to claim 1, further comprising a packing label applied to an outer surface of the battery.

6. A battery pack comprising:
    a battery having an upper planar surface, a lower planar surface and four substantially planar side surfaces extending between the upper surface and the lower surface, the four side surfaces extending substantially perpendicular to the upper and lower surfaces;
    a pack case having an inner space to receive the battery, the pack case being a frame-shaped member that surrounds only the side surfaces of the battery; and
    an insulating material filled in an empty space defined between at least one side of the pack case and one of the side surfaces of the battery,
    wherein the battery includes cathodes, anodes, separators, and an electrolyte contained in a battery case in a sealed state, the cathodes, anodes and separators define an electrode assembly, and wherein electrode terminals of the electrode assembly protrude from the battery case and are bent around and into contact with one of the side surfaces of the battery.

7. The battery pack according to claim 6, wherein the battery is a pouch-shaped battery.

8. The battery pack according to claim 6, wherein the insulating material is thermally melted to fill in the empty space between the at least one side of the pack case and said one of the side surfaces of the battery and is solidified in place.

9. The battery pack according to claim 6, wherein the insulating material is filled in the empty space between the remaining side surfaces of the battery and the frame-shaped member.

10. The battery pack according to claim 6, further comprising a packing label applied to at least one of the upper surface and lower surface of the battery.

11. The battery pack according to claim 6, wherein the insulating material is a plastic resin.

12. The battery pack according to claim 6, wherein the insulating material is a material that is solidified by a chemical reaction and/or a physical reaction after the material is filled in the empty space between the at least one side of the pack case and said one of the side surfaces of the battery.

13. The battery pack according to claim 6, wherein the surface area of the upper surface is greater than the surface area of one of the side surfaces.

* * * * *